United States Patent
Kinoshita et al.

(10) Patent No.: US 9,206,567 B2
(45) Date of Patent: Dec. 8, 2015

(54) AIR-BLOW WORKING MACHINE

(71) Applicant: YAMABIKO CORPORATION, Ohme-shi, Tokyo (JP)

(72) Inventors: Yusuke Kinoshita, Akishima (JP); Yoshihiro Yamauchi, Yokosuka (JP)

(73) Assignee: Yamabiko Corporation, Ohme-shi, Tokyo (JP)

( * ) Notice: Subject to any disclaimer, the term of this patent is extended or adjusted under 35 U.S.C. 154(b) by 647 days.

(21) Appl. No.: 13/666,209

(22) Filed: Nov. 1, 2012

(65) Prior Publication Data

US 2013/0108423 A1    May 2, 2013

(30) Foreign Application Priority Data

Nov. 2, 2011 (JP) .................................. 2011-241250

(51) Int. Cl.
  *E01H 1/08* (2006.01)
  *A01G 1/12* (2006.01)
  *F04B 39/00* (2006.01)

(52) U.S. Cl.
  CPC .............. *E01H 1/0809* (2013.01); *A01G 1/125* (2013.01)

(58) Field of Classification Search
  CPC ...... E01H 1/0809; A01G 1/125; F04D 29/66; F04D 29/661; F04D 29/663; F04D 29/665; F04B 39/0033; F04B 39/005; F04B 53/001
  See application file for complete search history.

(56) References Cited

U.S. PATENT DOCUMENTS

| | | | | |
|---|---|---|---|---|
| 3,650,639 | A * | 3/1972 | Greene et al. | 417/368 |
| 5,873,284 | A * | 2/1999 | Stegall et al. | 74/525 |
| 2005/0123410 | A1* | 6/2005 | Saitou et al. | 417/234 |
| 2008/0099275 | A1* | 5/2008 | Seel | 181/202 |
| 2010/0186688 | A1* | 7/2010 | Wada et al. | 123/41.65 |

FOREIGN PATENT DOCUMENTS

JP    2009-91719    4/2009

* cited by examiner

*Primary Examiner* — Richard Edgar
*Assistant Examiner* — Brian O Peters
(74) *Attorney, Agent, or Firm* — Merchant & Gould P.C.

(57) ABSTRACT

The air-blow working machine comprises a fan provided in a fan casing and a drive unit to drive the fan, and discharges an airflow generated by the rotating fan. The fan casing has an inner wall disposed between the fan and the drive unit. A smooth surface is formed on the face of the inner wall on the side of the fan. A first concavo-convex portion is formed on the face of the inner wall on the side of the drive unit. Thereby, a noise is reduced without an influence upon performance for blowing air.

6 Claims, 5 Drawing Sheets

UPPER PART
LEFT ← → RIGHT
LOWER PART

AIR-BLOW WORKING MACHINE

CROSS REFERENCE TO RELATED APPLICATIONS

This application claims the foreign priority benefit under Title 35, United State Code, 119 (a)-(d) of Japanese Patent Application No. 2011-241250, filed on Nov. 2, 2011 in the Japan Patent Office, the disclosure of which is herein incorporated by reference in its entirety.

BACKGROUND OF THE INVENTION

1. Technical Field

The present invention relates to an air-blow working machine to discharge airflow, for example, a blower.

2. Description of Background Art

A portable air-blow working machine which is for blowing away target objects like fallen leaves or twigs for cleaning comprises a fan accommodated in a fan casing and an engine for rotating the fan. It is constructed so that an airflow generated by the rotating fan is discharged through a blower tube connected to an outlet of the fan casing. For example, the patent document 1 (JP, 2009-091719, A) discloses such a portable blower as one type of an air-blow working machine.

SUMMARY OF THE INVENTION

However, an air-blow working machine in prior art like the above-mentioned air-blow working machine has a problem that drive sounds generated during a drive of an engine and a fan are diffused outside so that a noise in operating the air-blow working machine is loud. Therefore, it is desired to reduce the noise.

It is an object of the present invention to provide an air-blow working machine enabling the reduction of the noise without an influence upon performance for blowing air to solve the above problem.

In order to solve the foregoing problem, the present invention provides an air-blow working machine comprising a fan provided in a fan casing and a drive unit to drive the fan. The working machine discharges airflow generated by the fan rotated by the drive unit from through an outlet of the fan casing. The fan casing is provided with an inner wall disposed between the fan and the drive unit. The inner wall has a smooth surface on the face thereof on the side of the fan, and a first concavo-convex portion on the face thereof on the side of the drive unit.

By the air-blow working machine mentioned above, drive sounds of the drive unit and the fan passing through the inner wall can be reduced thanks to an enlargement of a surface area of the inner wall by forming the first concavo-convex portion on the inner wall of the fan casing. And the first concavo-convex portion is formed on the face of the inner wall on the side of the drive unit and not on the side of the fan, so an increase of a resistance of the airflow in the fan casing can be prevented. That is, according to the present invention, the drive sound of the fan passing through the inner wall can be efficiently reduced without an influence upon performance for blowing air by forming the first concavo-convex portion on the surface on the opposite side of the fan. Then the number of parts of the air-blow working machine can be lowered in comparison with a construction having an acoustic material like a foaming resin adhered onto the fan casing, so an assembly work for the fan casing can be simplified.

As a preferred embodiment of the foregoing air-blow working machine, a rotating shaft of the drive unit is passed through a hole formed in the inner wall, and the fan is attached to the rotating shaft, then the first concavo-convex portion of the inner wall is formed around the hole and curved along a circumference of the hole.

By this embodiment, the drive sound passing through the inner wall can be more efficiently reduced.

To be more concrete, the first concavo-convex portion of the inner wall is formed around the hole with an arrangement of recesses or protuberances curved along a circumference of the hole, or with a prolonged recess like a groove or a prolonged protuberance curved along a circumference of the hole. A groove is one type of a recess in this invention.

As a further preferred embodiment, a plurality of recesses (short recesses or prolonged recesses) and/or protuberances (short protuberances or prolonged protuberances) of said first concavo-convex portion are arranged along the radial direction of said hole.

By this embodiment, the drive sound passing through the inner wall can be more efficiently reduced.

As a further preferred embodiment, a cover is provided over at least a part of the drive unit and a second concavo-convex portion is formed on an inner face of the cover. By this embodiment, the drive sound of the drive unit passing through the cover can be reduced.

By the air-blow working machine according to the present invention, the drive sound to be diffused outside passing through the fan casing can be efficiently reduced thanks to the first concavo-convex portion formed on the face of the inner wall of the fan casing on the side of the drive unit, so a noise can be reduced without an influence upon performance for blowing air.

DETAILED DESCRIPTION OF THE PREFERRED EMBODIMENTS

An embodiment to embody the present invention will be explained in detail with reference to the attached drawings.

First, a direction of front, rear, left, right, upper part or lower part in the following description is shown in each Figure. These directions are introduced in order to explain the structure of the air-blow working machine and don't limit the structure of the air-blow working machine according to the present invention.

Figure 1:
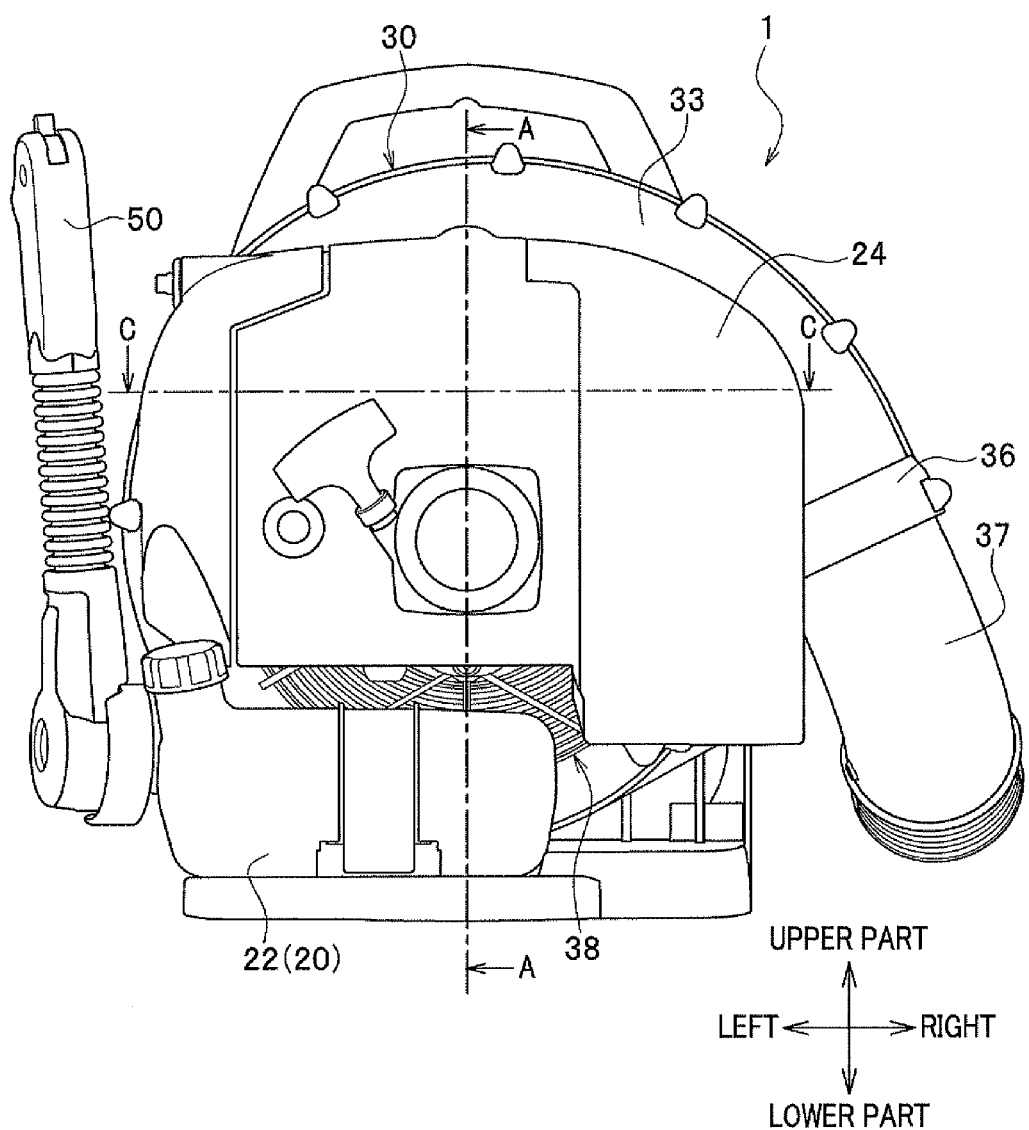
FIG. 1 is a side view of an air-blow working machine in an embodiment according to the present invention in a view from the drive unit side.

The air-blow working machine 1 in an embodiment shown in FIG. 1 is capable of being carried by a worker which is held on a carrying frame (not shown) that is on the worker's back. The worker operates the air-blow working machine to discharge airflows at a high speed toward the ground from through a pipe (not shown) connected with the fan casing 30. The airflows clear the ground by blowing away target objects like fallen leaves or twigs.

Figure 2:
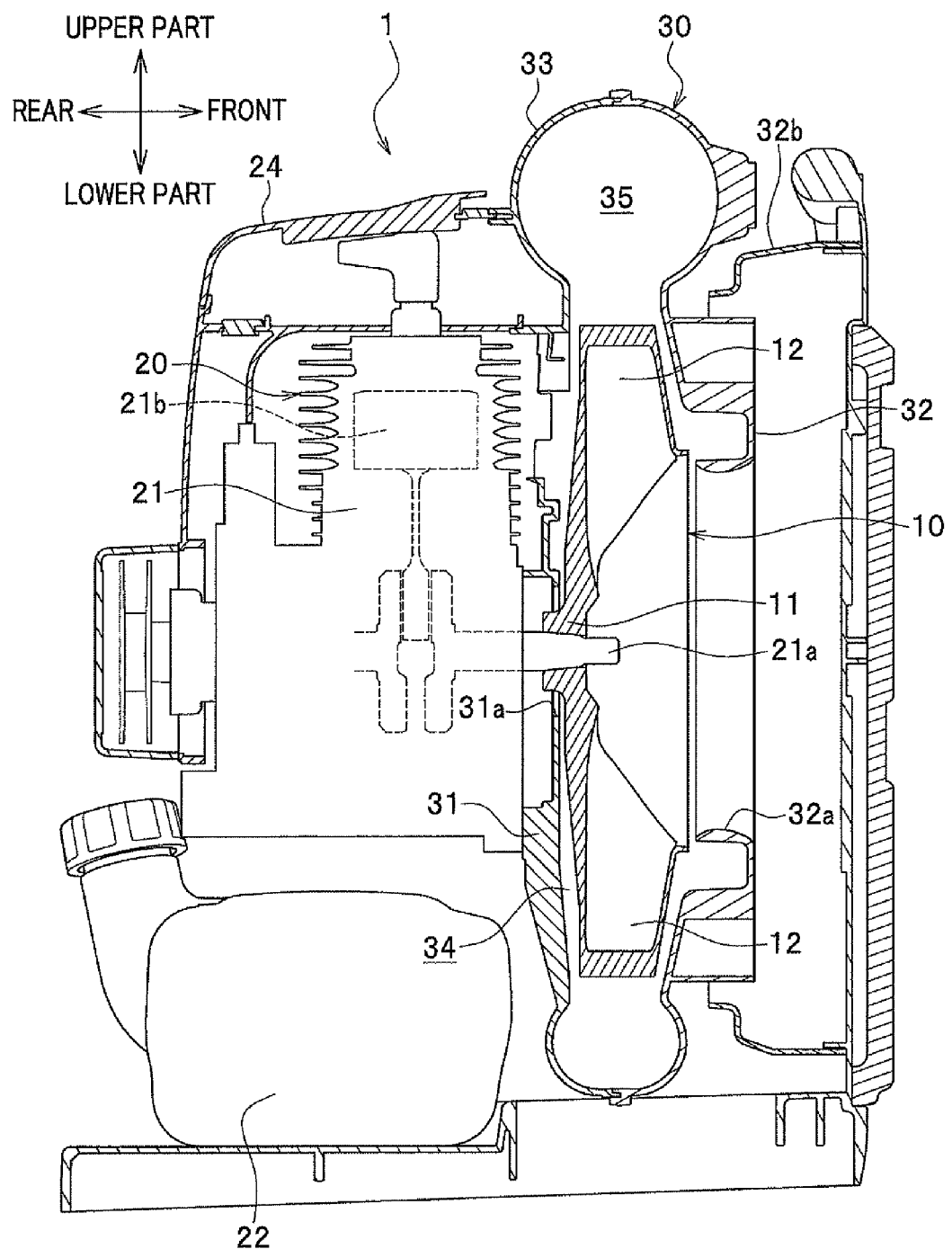
FIG. 2 is a sectional view of the air-blow working machine taken along the line A-A of FIG. 1.

The air-blow working machine 1 comprises a fan 10 accommodated in the fan casing 30 and a drive unit 20 to drive the fan 10 as shown in FIG. 2. An operation lever 50 is attached on the left side of the drive unit 20 to adjust an output of the drive unit 20 as shown in FIG. 1.

The air-blow working machine 1 can generate high speed airflow in the fan casing 30 by rotating the fan 10 in the fan casing 30 as shown in FIG. 2. And the air-blow working machine 1 is constructed so that it discharges airflow generated in the fan casing 30 outside through a blower tube 37 connected with the fan casing 30 as shown in FIG. 1.

The drive unit 20 in this embodiment is an engine having a cylinder block 21 in which a cylinder is formed at an upper position thereof and a crank chamber is formed at the lower position thereof, and a fuel tank 22 disposed under the cylinder block 21 as shown in FIG. 2.

The rotating shaft 21a projects toward the front side from the lower portion of the cylinder block 21. The rotating shaft 21a is a crank shaft of the drive unit 20. Upward and downward motions of a piston 21b in the cylinder are converted into a rotational motion of the rotational shaft 21a.

And a plastic engine cover 24 is provided over the upper portion of the cylinder block 21. The engine cover 24 is fastened to the cylinder block 21 by fastener members like bolts.

The fan 10 is rotor blades disposed in front of the drive unit 20 and is attached to the front end portion of the rotating shaft 21a. The fan 10 has a cylindrical attaching portion 11 and a plurality of blades 12 formed around the attaching portion 11. The attaching portion 11 is fitted upon the front end portion of the rotating shaft 21a. Thus the fan 10 is fixed at the front end portion of the rotating shaft 21a to rotate together with the rotating shaft 21a.

The fan casing 30 has a box type body formed of a plastic material and including an inner wall 31 like a circular plate disposed on the rear side thereof, an outer wall 32 like another circular plate disposed on the front side thereof and a peripheral wall 33 formed along peripheries of the inner wall 31 and the outer wall 32. An inlet port 32a is provided at the central portion of the outer wall 32. The fan casing 30 in this embodiment is constructed to be able to be divided into two parts. One of the two parts is a front side part, namely, a part on the side of the outer wall 32, and the other is a rear side part, namely, a part on the side of the inner wall 31.

An accommodation space 34 to accommodate the fan 10 is disposed between the inner wall 31 and the outer wall 32 of the fan casing 30. The inner wall 31 is disposed on the front side of the drive unit 20 and fixed to the cylinder block 21 by fastener members like bolts. A circular through hole 31a is provided at the central portion of the inner wall 31. The rotating shaft 21a passes through the through hole 31a rotatively therein and the tip of the rotating shaft 21a projects into the accommodation space 34. Then the fan 10 is attached to the tip of the rotating shaft 21a in the accommodation space 34.

Thus the inner wall 31 of the fan casing 30 is disposed between the fan 10 and the drive unit 20 so that the accommodation space 34 to dispose the fan 10 therein and another space to dispose the drive unit 20 therein are separated from each other by the inner wall 31.

An airflow channel 35 is formed inside the peripheral wall 33 and along the outer periphery of the accommodation space 34 to be in communication with the accommodation space 34 at the inner side thereof. At the front portion of the peripheral wall 33, a cylindrical outlet 36 is formed which outlet projects toward a slant lower area. And the outlet 36 is communicated with the airflow channel 35 shown in FIG. 2 and is a part to be connected with the base end part of the cylindrical blower tube 37 by fitting the tube 37 onto the inside thereof.

In the foregoing air-blow working machine 1, the fan 10 is secured to the rotating shaft 21a and rotates in the accommodation space 34 in the fan casing 30 in accordance with the output of the drive unit 20 (refer to FIG. 2).

Therefore, a high speed airflow is generated in the fan casing 30 by the rotating fan 10 while air is sucked into the accommodation space 34 through the inlet port 32a. The airflow in the fan casing 30 is introduced into the blower tube 37 (refer to FIG. 1) through the outlet 36 after it flows in the airflow channel 35, and then it is discharged outside from the tip end of the blower tube 37.

Figure 3:
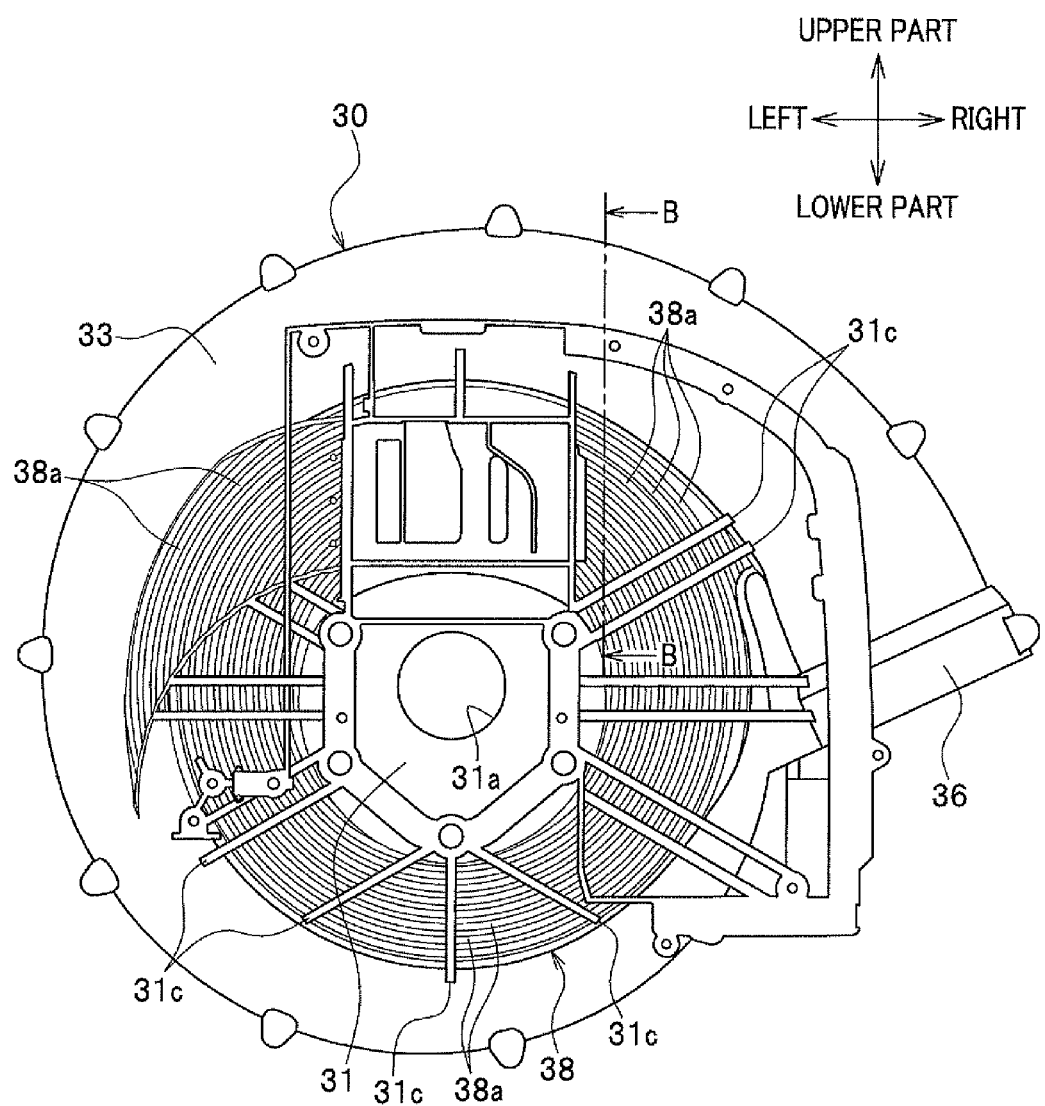
FIG. 3 is a side view of a fan casing of the air-blow working machine of FIG. 1 in a view from the drive unit side.
Figure 4:
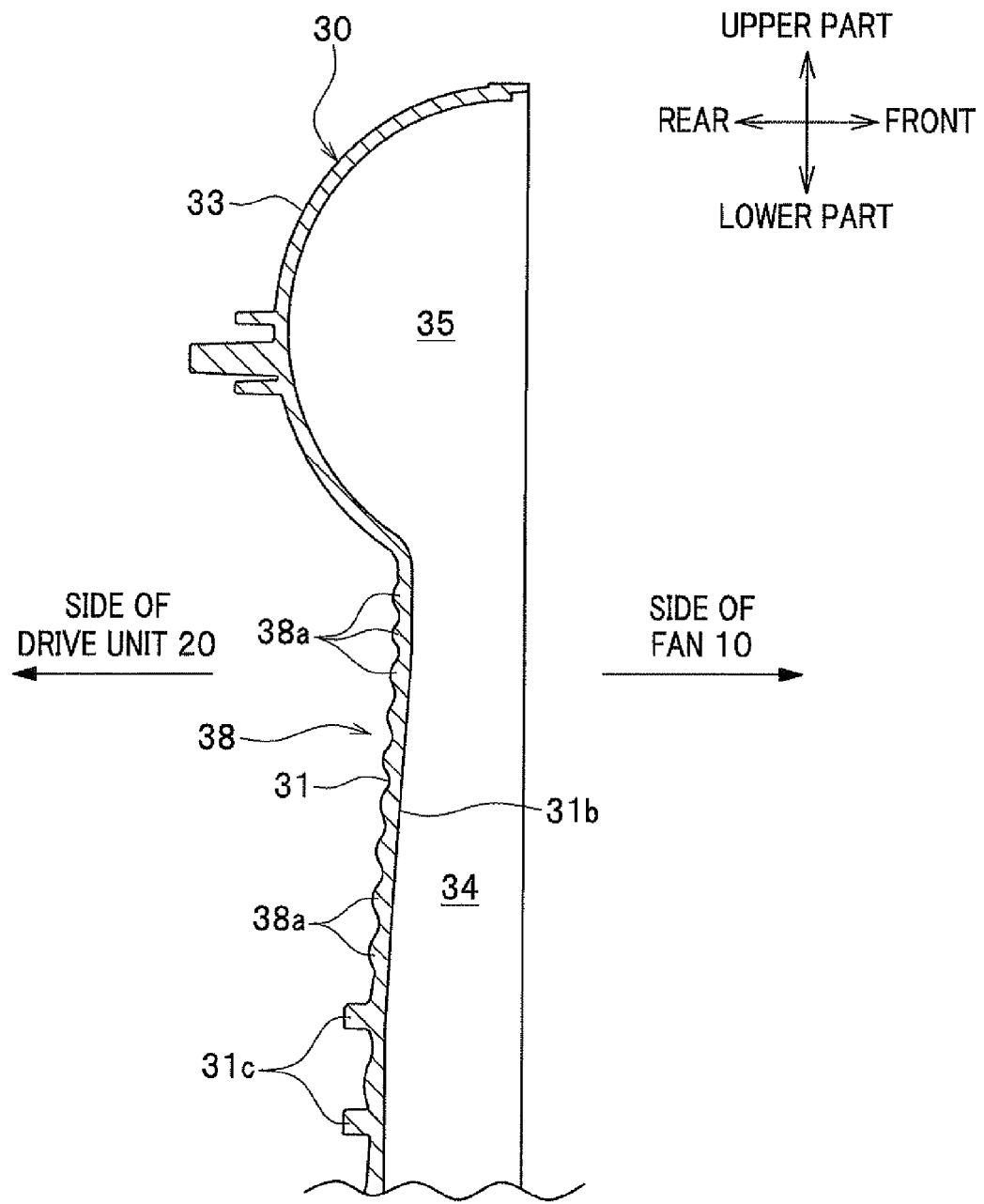
FIG. 4 is a sectional view of the fan casing taken along the line B-B of FIG. 3.

The fan casing 30 in this embodiment has the inner wall 31 with a smooth surface 31b formed on a face thereof on the side of the fan 10 (on the right side of FIG. 4) and a first concavo-convex portion 38 on the other face thereof on the side of the drive unit 20 (on the left side of FIG. 4) as shown in FIG. 4. Furthermore, ribs 31c for reinforcement are formed on the same face as the first concavo-convex portion 38 as shown in FIGS. 3 and 4.

The first concavo-convex portion 38 on the inner wall 31 has a plurality of prolonged protuberances 38a which are formed like circles or arcs curved along the periphery of the through hole 31a and arranged in a radial direction of the through hole 31a. The plurality of prolonged protuberances 38a like circles may be formed by one or more prolonged spiral protuberances. An outer surface of the protuberance 38a is a curved surface, and a cross sectional shape of the first concavo-convex portion 38 is a wave as shown in FIG. 4. Thus a surface area of the inner wall 31 is enlarged thanks to the form of the first concavo-convex portion 38 on the face of the inner wall 31 on the side of the drive unit 20 in comparison with a case that the face of the inner wall 31 on the side of the drive unit 20 is formed to be smooth.

A second concavo-convex portion 25 is formed on the inner face of the engine cover 24, that is, on the face of the engine cover 24 on the side of the drive unit 20. The second concavo-convex portion 25 of the engine cover 24 is formed by a plurality of protuberances 25a or prolonged protuberances 25a like projections on the face of the engine cover on the side of the drive unit 20.

A noise out of the air-blow working machine 1 mentioned above can be more efficiently reduced, because each drive sound of the fan 10 and the drive unit 20 is simultaneously reduced.

An increase of a resistance of airflow generated in the fan casing 30 can be prevented because the first concavo-convex portion 38 of the inner wall 31 is formed on the face of the inner wall on the side of the drive unit 20. That is, the drive sound of the fan 10 passing out through the inner wall 31 can be efficiently reduced without an influence upon performance for blowing air in the air-blow working machine 1 by forming the first concavo-convex portion 38 on the face of the inner wall 31 on the opposite side of the fan 10 in the air-blow working machine 1.

Figure 5:
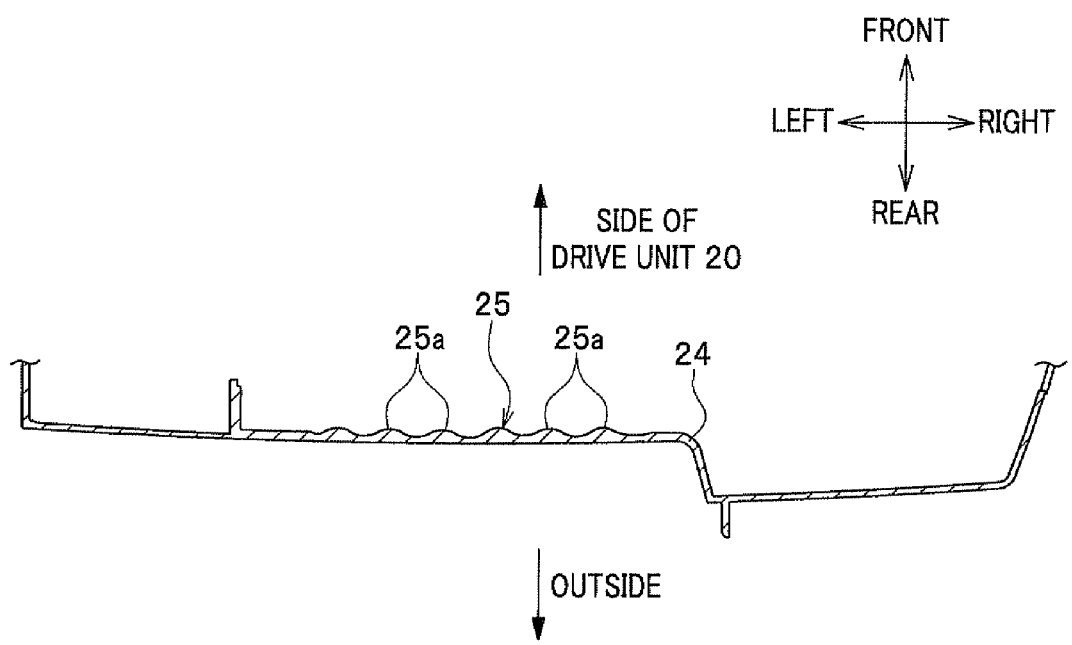
FIG. 5 is a sectional view of an engine cover taken along the line C-C of FIG. 1.

And the drive sound of the drive unit 20 passing through the engine cover 24 can be reduced by forming the second concavo-convex portion 25 on the face of the engine cover 24 covering over the drive unit 20 on the side of the drive unit 20 as shown in FIG. 5 so that a surface area of the engine cover 24 is enlarged.

Furthermore, the number of parts constructing the air-blow working machine 1 can be lowered in comparison with a prior construction having an acoustic material like a foaming resin adhered onto the inner face of the fan casing 30 so that a manufacturing process for the air-blow working machine 1 can be simplified, because the first concavo-convex portion 38 is formed on the face of the inner wall 31 of the fan casing 30.

An embodiment according to the present invention has been explained above. However, the embodiment may be properly modified within the scope of the present invention without limiting to the embodiment mentioned above.

For example, the first concavo-convex portion 38 on the inner wall 31 is formed like circles or arcs in this embodiment as shown in FIG. 3. However, the form of the first concavo-convex portion should not be limited to this embodiment and may be linear and/or point-like recesses and/or linear and/or point-like protuberances. Furthermore, a height difference between top and bottom of the first concavo-convex portion 38 or a pitch of the tops or the bottoms of the first concavo-convex portion 38 should not be limited.

And the protuberance 38a has a curved outer surface, that is, the cross sectional shape of the protuberance 38a is curved. So the first concavo-convex portion 38 has a wave-like cross section in this embodiment but should not be limited to that shape and may be formed to be a triangular or rectangular cross section.

Furthermore, the first concavo-convex portion 38 is made by forming the protuberances 38a on the face of the inner wall 31 on the side of the drive unit 20 in this embodiment, but the first concavo-convex portion 38 may be made by forming grooves on the face of the inner wall 31 on the side of the drive unit 20 which grooves can be formed, for example, by cutting.

The drive unit 20 as a driving source for an air-blow working machine 1 in this embodiment has an engine as shown in FIG. 2 but may have an electric motor.

The knapsack air-blow working machine 1 has been explained as an example according to the present invention in this embodiment as shown in FIG. 1. But the present invention can also be applied to a handheld air-blow working machine which a worker can carry by his hand. Furthermore, the air-blow working machine according to the present invention may be constructed so that a powdered medicine is scattered by using the airflow discharged from the outlet of the air-blow working machine.

DESCRIPTION OF REFERENCE NUMERALS

| | |
|---|---|
| 1 | Air-blow working machine |
| 10 | Fan |
| 12 | Blade |
| 20 | Drive unit |
| 21 | Cylinder block |
| 21a | Rotating shaft |
| 24 | Engine cover |
| 25 | Second concavo-convex portion (engine cover) |
| 25a | Protuberance |
| 30 | Fan casing |
| 31 | Inner wall |
| 31a | Through hole |
| 31b | Smooth surface |
| 32 | Outer wall |
| 32a | Inlet port |
| 33 | Peripheral wall |
| 34 | Accommodation space |
| 35 | Airflow channel |
| 36 | Outlet |
| 37 | Blower tube |
| 38 | First concavo-convex portion (inner wall) |
| 38a | Protuberance |
| 50 | Operation lever |

What is claimed is:

1. An air-blow working machine comprising a fan provided in a fan casing and a drive unit to drive the fan, the working machine discharging an airflow generated by the fan rotated by the drive unit from through an outlet of the fan casing, wherein said fan casing comprises an inner wall disposed between said fan and said drive unit, and said inner wall has a first concavo-convex portion on the side of said drive unit and a smooth surface on the side of said fan.

2. An air-blow working machine according to claim 1, wherein a cover is provided over at least a part of said drive unit, a second concavo-convex portion being formed on an inner face of said cover.

3. An air-blow working machine according to claim 1, wherein a rotating shaft of said drive unit passes through a hole formed in said inner wall, said fan being attached to said rotating shaft, and said first concavo-convex portion of the inner wall being formed around said hole and curved along a circumference of said hole.

4. An air-blow working machine according to claim 3, wherein a cover is provided over at least a part of said drive unit, a second concavo-convex portion being formed on an inner face of said cover.

5. An air-blow working machine according to claim 3, wherein a plurality of recesses and/or protuberances of said first concavo-convex portion are arranged along the radial direction of said hole.

6. An air-blow working machine according to claim 5, wherein a cover is provided over at least a part of said drive unit, a second concavo-convex portion being formed on an inner face of said cover.

* * * * *